(12) United States Patent
Feichtner et al.

(10) Patent No.: US 9,221,934 B2
(45) Date of Patent: Dec. 29, 2015

(54) PROCESS AND PLANT FOR MANUFACTURING POLYETHYLENE-SILANE-COPOLYMERS

(71) Applicant: Borealis AG, Vienna (AT)

(72) Inventors: Helmut Feichtner, Vienna (AT); Bernt-Ake Sultan, Stenungsund (SE); Gabriel Ruess, Vienna (AT); Bjoern Voigt, Hisings Backa (SE); Roger Carlsson, Saeve (SE); Martin Anker, Hisings Kaerra (SE); Mattias Bergqvist, Goeteborg (SE); Kristian Dahlen, Stora Hoega (SE); Kjell Fossum, Stenungsund (SE); Thomas Hjertberg, Kungshamn (SE); Perry Nylander, Goeteborg (SE)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/382,474

(22) PCT Filed: Mar. 7, 2013

(86) PCT No.: PCT/EP2013/054612
§ 371 (c)(1),
(2) Date: Sep. 2, 2014

(87) PCT Pub. No.: WO2013/132010
PCT Pub. Date: Sep. 12, 2013

(65) Prior Publication Data
US 2015/0112032 A1 Apr. 23, 2015

(30) Foreign Application Priority Data
Mar. 7, 2012 (EP) .................................. 12158404

(51) Int. Cl.
*C08F 2/02* (2006.01)
*C08F 2/38* (2006.01)
*C08F 210/02* (2006.01)
*C08F 230/08* (2006.01)
(Continued)

(52) U.S. Cl.
CPC ........... *C08F 210/02* (2013.01); *B01J 19/2415* (2013.01); *C08F 2/002* (2013.01); *C08F 2/01* (2013.01); *B01J 2219/24* (2013.01)

(58) Field of Classification Search
USPC ..................................... 526/64, 920; 422/131
See application file for complete search history.

(56) References Cited

U.S. PATENT DOCUMENTS

| 6,596,241 B2 | 7/2003 | Donck | |
| 7,582,709 B2 * | 9/2009 | Goossens et al. | 526/64 |

(Continued)

FOREIGN PATENT DOCUMENTS

| EP | 0647244 B2 | 4/1995 |
| EP | 1923404 A1 | 5/2008 |

(Continued)

*Primary Examiner* — Fred M Teskin
(74) *Attorney, Agent, or Firm* — The Webb Law Firm

(57) ABSTRACT

The present invention relates to a process for manufacturing polyethylene-silane-copolymer conducted in a plant including at least one compressor unit and at least one reactor downstream of the compressor unit. The process includes the steps of (a) feeding a first feed stream including ethylene into the at least one compressor unit and subsequently to the at least one reactor, and (b1) feeding a second feed stream including at least one silane comonomer to the at least one reactor as front feed and/or (b2) feeding a second feed stream including at least one silane comonomer to the at least one reactor at at least one location along the reactor.

20 Claims, 5 Drawing Sheets

(51) Int. Cl.
*B01J 19/24* (2006.01)
*C08F 2/00* (2006.01)
*C08F 2/01* (2006.01)

(56) References Cited

U.S. PATENT DOCUMENTS 7,834,115 B2 * 11/2010 Johansson et al. ............ 526/279
2005/0192414 A1  9/2005 Donck et al.

2012/0273253 A1  11/2012 Nilsson et al.
2012/0285722 A1  11/2012 Nilsson et al.
2012/0305284 A1  12/2012 Nilsson et al.

FOREIGN PATENT DOCUMENTS

| WO | 2011057925 | A1 | 5/2011 |
| WO | 2011057926 | A1 | 5/2011 |
| WO | 2011057927 | A1 | 5/2011 |
| WO | 2011128147 | A1 | 10/2011 |

* cited by examiner

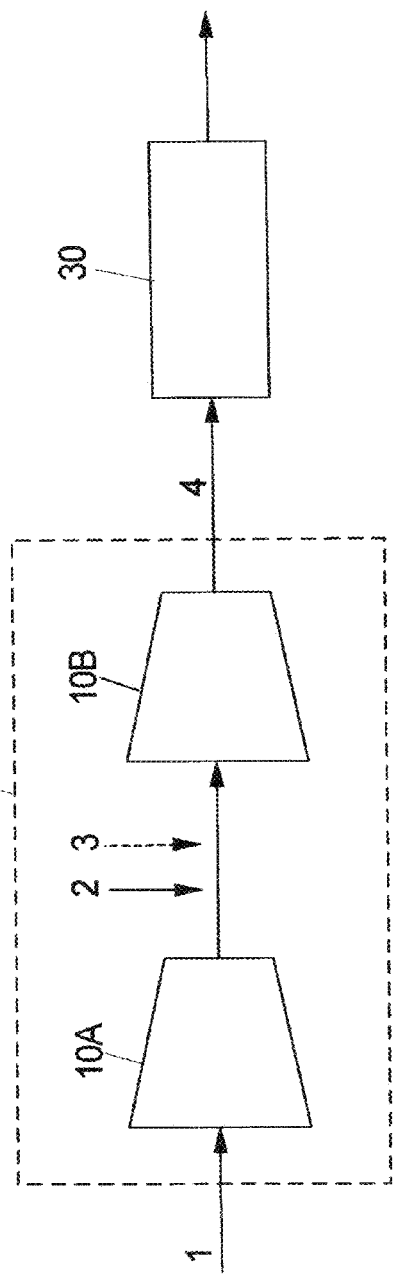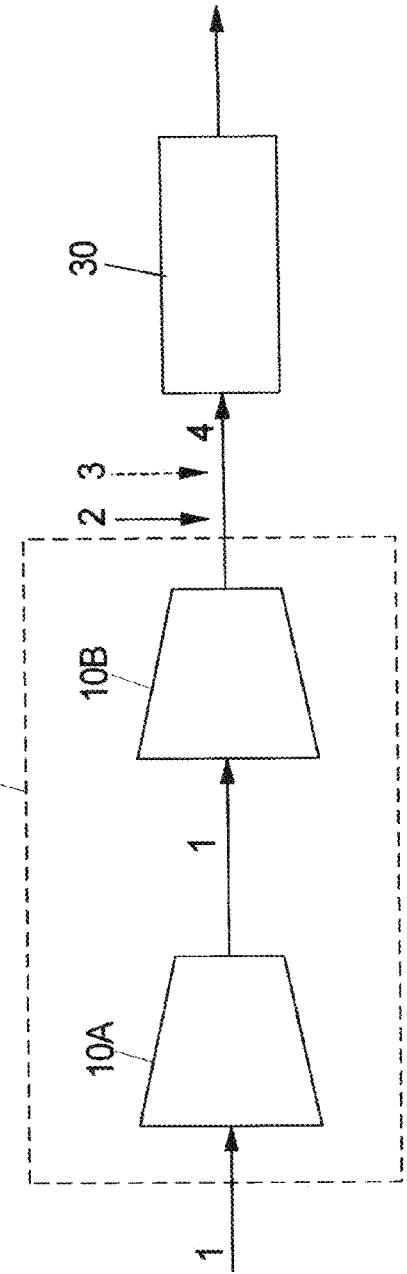

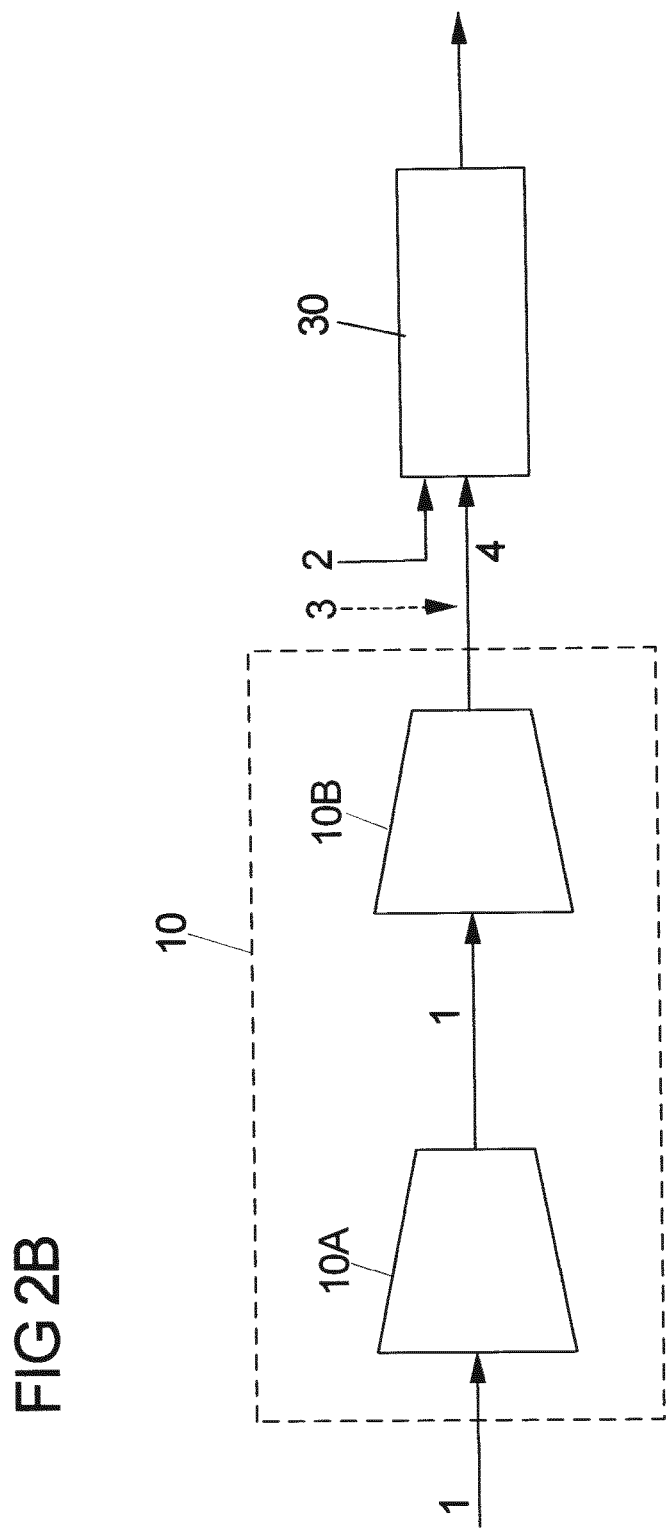

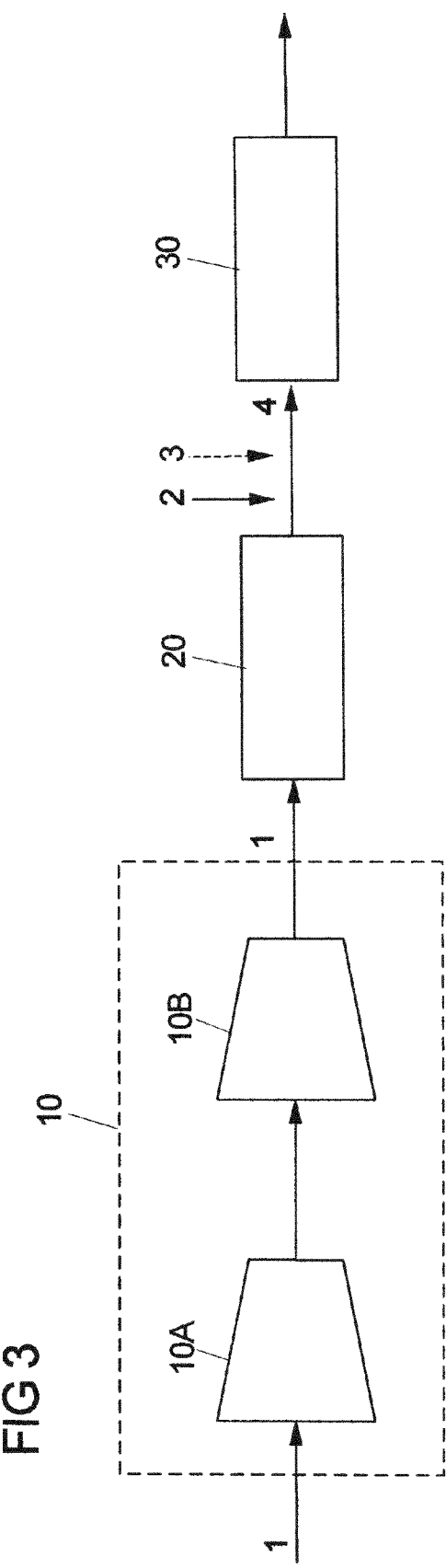
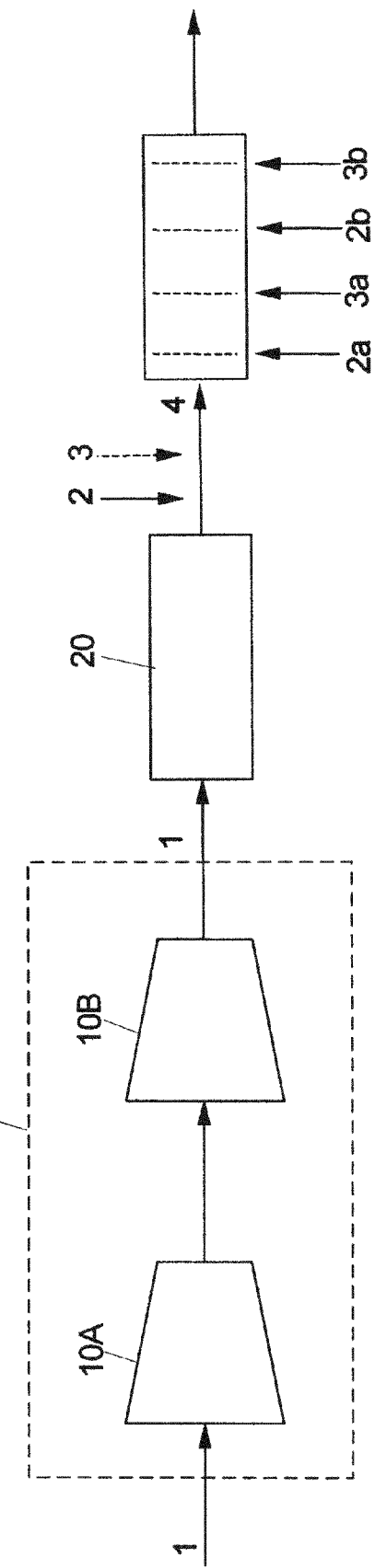

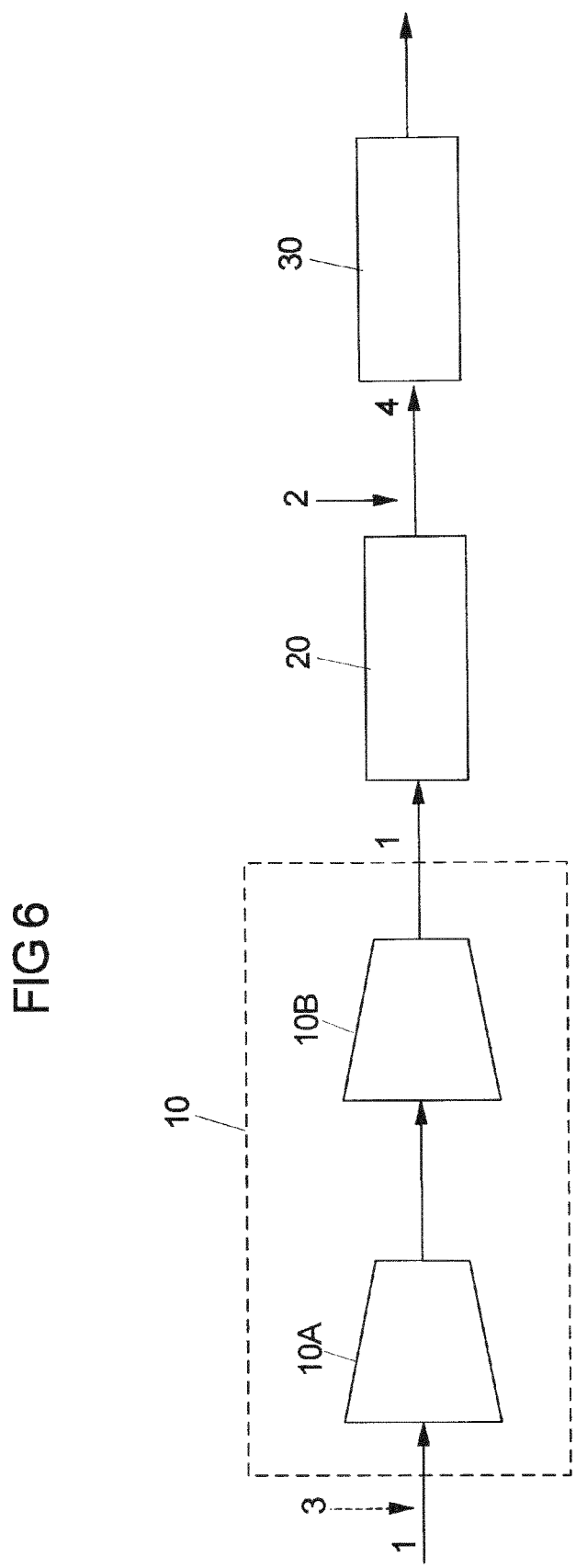

ically a tubular reactor. The exothermic polymerization reaction is carried out under operating pressures between 500 and 4000 bar and temperatures between 165 to 340° C. The polymerization of ethylene is started by free radical initiator, usually using peroxides or oxygen.

PROCESS AND PLANT FOR MANUFACTURING POLYETHYLENE-SILANE-COPOLYMERS

CROSS-REFERENCE TO RELATED APPLICATIONS

This application is the United States national phase of International Application No. PCT/EP2013/054612 filed Mar. 7, 2013, and claims priority to European Patent Application No. 12158404.9 filed Mar. 7, 2012, the disclosures of which are hereby incorporated in their entirety by reference.

BACKGROUND OF THE INVENTION

1. Field of the Invention

The present invention relates to a process for manufacturing polyethylene and a plant for conducting said process.

2. Description of Related Art

Polyethylene, in particular low density polyethylene (LDPE) is in general manufactured in a high pressure process using a reactor such as a tubular reactor. The exothermic polymerization reaction is carried out under operating pressures between 500 and 4000 bar and temperatures between 165 to 340° C. The polymerization of ethylene is started by free radical initiator, usually using peroxides or oxygen.

These processes are highly integrated processes requiring complex plant networks. A LDPE production plant comprises usually one or multiple compressor units for compressing the ethylene feed, a preheater for pre-heating the ethylene feed and opt. other substance, a tubular reactor for the actual polymerization process of the ethylene feed coming from the preheater, a high pressure separator (HPS) for separating the polymer monomer mixture leaving the tubular reactor and a low pressure separator (LPS) for further separation of the polymer monomer mixture. The molten polymer is the passed from the LPS to a finishing section including an extruder. The monomer phase comprising ethylene as main component is usually recycled to the ethylene feed entering the compressor units (U.S. Pat. No. 6,596,241 B1, US 2005/0192414 A1).

Low density polyethylene is characterized by a relative high number of short side chains. The short chain branches regulate the flexibility and thus density of the polymer. An increased number of short chain branches improves the flexibility and optical properties, but reduces the mechanical strength. The melt strength in turn is influenced by the molecular weight tail and number of long chain branches.

In order to regulate the molecular weight so called chain transfer agents are added to the ethylene feed. These chain transfer agents promote the transfer of a growing polymer chain to another molecule thereby reducing the average molecular weight of the final polymer.

Besides chain transfer agents comonomers can be added to the ethylene feed in order to modulate the final polymer properties. It is for instance desirable to obtain polymers, which are able to be crosslinked following the melt forming process of its final product. Crosslinked polyethylenes are for instance extensively used for wire and cable applications or pipes.

Crosslinking can be carried out by for instance adding free radical forming agents such as peroxides to the polymer composition prior extrusion of the cable or pipe. The crosslinking is initiated by heating in a subsequent vulcanisation step in a manner that peroxide is decomposed under formation of free radicals.

Another possibility for crosslinking is the introduction of hydrolysable silane groups into the polymer. In this case crosslinking is carried out by moisture curing wherein in a first step the silane groups are hydrolysed resulting in the formation of silanol groups, which in a second step are crosslinked by a condensation reaction releasing water.

Processes for producing polyethylene-silane copolymers are known. EP 1 923 404 B1 describes a method wherein ethylene and an unsaturated silane compound are polymerised at a pressure of 100-400 MPa and at a temperature of 80-350° C. in a multi-zone reactor comprising two or more reaction zones, wherein more than 60 wt % silane compound are added to the first reaction zone of the reactor. The feeding of the majority of the silane compound into the first reaction zone of a reactor allows for an increased conversion of the silane comonomer. In this case the stream containing the unsaturated silane compound was compressed in a compressor before entering the reactor.

A general problem during the production of polyethylene-silane-copolymers is that during its production the volatile silane comonomer such as vinyltrimethylsilane (VTMS) is able to leave the plant equipment such as the compressor unit of a plant through wear and tear of the sealings and stuffing boxes to the motionwork where abrasive silanol particles are formed leading to increased need for maintenance and downtime of the hypercompressor including vibrations.

Another side effect of silane comonomers is that they premature polymerise already during compression causing plugging of the intercooler and preheater piping. It also has a negative impact on the lubrication of the movable part of the compressor as the silane influences the viscosity of the lubricant as well as its adhesion forces to metals. Furthermore, the high silane concentration in the leakage gas/purge gas requires a sophisticated treatment of this stream to separate the silane prior to further processing

SUMMARY OF THE INVENTION

It would be therefore desirable to provide a process which avoids these problems and increases the overall efficiency of the process, in particular by reducing the downtime of the plant needed for maintenance and cleaning.

According to a first aspect of the invention this object is being achieved by providing a method having the features of claim 1.

According to an exemplary embodiment of the invention a process for manufacturing polyethylene-silane-copolymers is provided, which is conducted in a plant comprising at least one compressor unit and at least one reactor being downstream of the compressor unit.

The present process comprises the steps of a) Feeding a first feed stream comprising ethylene into the at least one compressor unit and subsequently to the at least one reactor, and b1) Feeding a second feed stream comprising at least one silane comonomer to the at least one reactor as front feed and/or b2) Feeding a second feed stream comprising at least one silane comonomer to the at least one reactor at one location along the reactor.

According to the present process the ethylene and silane comonomer are not fed together to the compressor unit, but rather separately. More precisely, only ethylene is fed to the compressor unit and is only mixed with the silane comonomer after leaving the compressor unit and/or after entering the reactor. It is thus also possible to feed the silane comonomer to the ethylene feed after said ethylene feed left the compressor unit and preferably after said ethylene feed left a preheater unit but before entering the synthesis reactor. Thus, silane comonomers do not undergo a pressurisation together with the ethylene feed within the compressor unit.

According to the present process the silane comonomer is either fed to the reactor as front feed or at at least one location along the reactor. When the silane comonomer is fed to the synthesis reactor as front feed it can either be fed or added to the transfer lines between compressor unit, preferably a preheater unit being downstream of the compressor unit, and the synthesis reactor or at one point along the reactor wall.

Avoiding pre-mixing of ethylene and silane comonomer during the compression step provides several advantages. For instance, by adding the silane comonomer to the ethylene feed and/or to the reactor after the compressor the formation of silane deposits, which are glass like, is avoided. This in turn reduces the need for maintenance and thus downtime for the compressor and thus the overall costs.

In an exemplary embodiment of the present process the ethylene of the first feed stream may come from different sources and may be pure or mixed with other components. Ethylene used may be pure fresh ethylene, ethylene recycled from the reactor without any further purification and/or ethylene recycled from the reactor which underwent gas purification before re-entering the compressor unit and thus the synthesis cycle.

In an exemplary embodiment of the present process the first feed stream comprising ethylene is fed into at least one preheater unit after leaving the compressor unit. Such a preheater unit is preferably arranged downstream of the compressor unit and upstream of the reactor. It is conceivable that the preheater unit consists of more than one vessel or subunits, preferably at least two subunits.

Subsequently, the second feed stream comprising the at least one silane comonomer may be fed to the first feed stream, which enters or leaves the at least one preheater unit. Thus, the silane comonomer can be added to the ethylene feed before or after said ethylene feed has been preheated, preferably after the preheater.

The front feed of the silane comonomer either as a mixture with the ethylene feed or in parallel to the ethylene feed along the reactor wall allows for high conversion of the silane comonomer and for reducing the overall production costs due to the avoidance of silane deposits and other negative interactions with compressor lubricants.

The injection of the silane comonomer such as VTMS into the reactor as front feed or to the first reaction zone of the reactor is the most economical. This is because the more efficient the conversion and thus the reaction the less silane comonomer passes unreacted through the reactor.

According to the present process the at least one silane comonomer is fed to the reactor as front feed, optionally as split feed, and at at least one location along the reactor. In this case the concentration of the silane comonomer being fed to the reactor at at least one location along the reactor is the same or differs from the concentration of the silane comonomer entering the reactor at the front.

The concentration of the silane comonomer being fed at the front of reactor can be thereby more than 50 wt %, preferably more than 75% of the concentration of the silane comonomer entering the reactor in total. The silane comonomer stream comprises preferably more than 25 wt % of silane comonomer and more preferably more than 50 wt % of silane comonomer.

In an exemplary embodiment of the present process the at least one silane comonomer if fed to the reactor at a location along the reactor is added to the reactor using at least one high pressure plunger pump, in particular of the type of LEWA plunger pumps.

According to a preferred embodiment the silane comonomer comprises an unsaturated silane compound, which is represented by the general formula $$RSiR'_nY_{3-n}$$

wherein R is an ethylenically unsaturated hydrocarbyl, hydrocarbyloxy or (meth)acryloxy hydrocarbyl group, R' is an aliphatic saturated hydrocarbyl group, Y is a hydrolysable organic group, and n is 0, 1 or 2. If there is more than one Y group, these do not have to be identical.

Preferred examples of the unsaturated silane compound are those wherein R is vinyl, allyl, isopropenyl, butenyl, cyclohexenyl or gamma-(meth)acryloxy propyl; Y is methoxy, ethoxy, formyloxy, acetoxy, propionyloxy or an alkyl- or arylamino group; and R', if present, is a ethyl, ethyl, propyl, decyl or phenyl group.

It is in particular preferred to use an unsaturated silane compound, which is represented by the formula $$CH_2=CHSi(OA)_3$$

wherein A is a hydrocarbyl group having 1-8 carbon atoms, in particular 1-4 atoms.

Preferred examples of an the unsaturated silane are selected from a group containing vinyl trimethoxysilane (VTMS) vinyl dimethoxyethoxy silane, vinyl triethoxysilane, gamma-(meth)acryloxypropyltri-methoxy-silane, gamma(meth)acryloxypropyltriethoxysilane, vinyl triacetoxysilane, and any combinations thereof.

In another exemplary embodiment at least one further polar comonomer is additionally fed to the feed stream comprising ethylene before said feed stream enters the compressor unit, is fed to the feed stream comprising ethylene before entering the at least one reactor as front feed and/or is fed to the reactor at at least one location along the reactor.

It is preferred if the at least one additional polar comonomer is selected from the group consisting of vinyl carboxylate esters; alpha-olefins; (meth)acrylates; vinyl ethers; aromatic vinyl compounds and any combination thereof.

It is particular preferred if the at least one additional polar comonomer is selected from a group consisting of vinyl acetate (EVA), methacrylates, in particular methyl acrylate (EMA), ethyl acrylate (EEA), butyl acrylate (EBA), methyl methacrylate (EMMA), glycidyl methacrylate (GMA), maleic anhydride (MAH) and acrylamide.

In a further exemplary embodiment of the present process a third feed stream comprising at least one chain transfer agent is fed to the combined feed streams comprising ethylene and the at least one silane comonomer before entering the at least one reactor or is fed to the reactor as separate front feed. Thus, ethylene, comonomer and chain transfer agent are only mixed shortly before entering the polymerisation reactor or are mixed within the reactor after entering the reactor as separate front feed.

In another preferred embodiment at least one chain transfer agent is additionally fed into the reactor at at least one location/position along the reactor, i.e. a chain transfer agent which might be the same or different as the one mixed with the ethylene and the silane comonomer before fed to the reactor, is introduced at any suitable position, preferably via an injection valve, along the reactor into the reaction mixture inside of the reactor.

In the context of this embodiment it is furthermore preferred that the concentration of the chain transfer agent being fed at a location along the reactor is the same or differs from the concentration of the chain transfer agent, in particular in the combined feed stream or as separate stream, entering the reactor as front feed. It is also possible that the concentration of the chain transfer agent in the streams fed along the reactor differs in each stream. Thus, each of the chain transfer agent containing streams fed to the reactor either as front feed or at one of the injection points along the reactor may have different chain transfer agent concentrations. This allows for a precise regulation of the chain transfer agent concentration along the reactor wall of the reactor.

It is however also conceivable that the third feed stream of chain transfer agent is fed to the ethylene stream before the ethylene stream enters the compressor unit. Thus, it is possible to compress and optionally preheat the ethylene monomer stream together with the chain transfer agent.

The chain transfer agent is preferably selected from a group consisting of aldehydes, such as propionaldehyde, acetaldehyde, benzaldehyde, alcohols, such as isopropanol, t-butanol, methanol, 2-methyl-3-buten-2-ol, ethanol, saturated and unsaturated hydrocarbons, such as propane, propylene, butene-1,4-methylpentane-1, isobutylene, diisobutylene, ethane, 2,2-dimethylpropane, 2-methyl-3-buten, cyclopropane, methane, benzene, butane, 2,2,4-trimethylpentane, n-hexane, isobutane, n-heptane, cyclohexane, methylcyclohexane, propylene, n-decane, cyclopentane, n-tridecane, toluene, isobutylene, diisobutylene, 4-methylpentene-1, p-xylene, buten-2, buten-1, octene-1,2,methylbutene-2, cumen, 2methyl-butene-1, ethylbenzene, n-hexadecene, 3-methyl-butene-1,2-ethylhexene-1, compounds comprising an ether, a keto group or a carboxyl group such as methyl ethyl ketone, ethylene oxide, vinyl-methyl-ether, methylacetate, t-butyl-acetate, methyl formate, ethyl acetate, methyl benzoate, ethyl benzoate, dimethoxymethane, n-butyl acetate, acetic anhydride, n-butyl benzoate, acetone, methyl butyrate, N,N-dimethylformamide, tetrahydrofuran, p-dioxane, 2-butanone, 3-methyl-2-butanone, compounds comprising other functional groups such as methyl vinyl sulfide, n-butyronitrile, tetramethylsilane, sulfur hexafluoride, perfluorpropane, dimethyl sulfoxide, triphenylphosphine, methylamine, N,N-diisopropylacetamide, 1,2-dichloethane, acetonitrile, N-ethylacetamide, N,N-diethylacetamide, 4,4-dimethylpentene-1, trimethylamine, N,N-dimethylacetamide, n-butyl isocyanate, n-butyl amine, diethyl sulfide, trimethylamine, 1-bromo-2-chlorethane, n-butyl isothiocyanate, methyl-3-cyanopropionate, tri-n-butylamine, isobutyronitrile, di-n-butylamine, methyl chloroacetate, 1,2-dibromoethane, dimethylamine, chloroform, 1,4-dichlorobutene-2, tri-n-butylphosphine, di-n-butyl-phosphine, dimethylphosphine, methyl cyanoacetate, carbon tetrachloride, bromotrichloromethane, phosphine, hydrogen, and mixtures thereof.

The use of propionaldehyde, propylene, propane, methyl ethyl ketone, hydrogen and isopropanol as chain transfer agent is in particular preferred.

In again a further exemplary embodiment of the process at least one polymerisation initiator is fed into the reactor as front feed and/or at least one location along the reactor. Usually the polymerisation initiator is injected into the reactor to start the polymerization reaction at desired position or reaction zone inside the reactor.

The polymerisation initiator is preferably selected from the group of organic peroxides. Examples of suitable organic peroxides are peroxy esters, peroxy ketals, peroxy ketones and peroxycarbonates, e.g. di(2-ethylhexyl)peroxydicarbonate, dicyclohexyl peroxydicarbonate, diacetyl peroxydicarbonate, tert-butyl peroxyisopropylcarbonate, di-tert-butyl peroxide, di-tert-amyl peroxide, dicumyl peroxide, 2,5-dimethyl-2,5-di-tert-butylperoxyhexane, tert butyl cumyl peroxide, 2,5-dimethyl-2,5-di(tert-butylperoxy)hex-3-yne, 1,3-diisopropyl monohydroperoxide or tert-butyl hydroperoxide, didecanoyl peroxide, 2,5-dimethyl-2,5-di(2-ethyl-hexanoylperoxy)hexane, tert-amyl peroxy-2-ethylhexanoate, dibenzoyl peroxide, tert butyl peroxy-2-ethylhexanoate, tert-butyl peroxydiethylacetate, tert-butyl peroxydiethylisobutyrate, tertbutylperoxy-3,5,5-trimethylhexanoate, 1,1-di(tert-butylperoxy)-3,3,5-trimethylcyclohexane, 1,1-di(tert-butylperoxy)cyclohexane, tert butyl peroxyacetate, cumyl peroxyneodecanoate, tert-amylperoxyneodecanoate, tert-amyl peroxypivalate, tert-butyl peroxyneodecanoate, tert-butylpermaleate, tert-butyl peroxypivalate, tert-butyl peroxyisononanoate, diisopropylbenzene hydroperoxide, cumene hydroperoxide, tert butyl peroxybenzoate, methyl isobutyl ketone hydroperoxide, 3,6,9-triethyl-3,6,9-trimethyl-triperoxycyclononane and 2,2-di(tertbutylperoxy)butane. Azoalkanes (diazenes), azodicarboxylic esters, azodicarboxylic dinitriles such as azobisisobutyronitrile and hydrocarbons which decompose into free radicals and are also referred to as C—C initiators, e.g. 1,2-diphenyl-1,2-dimethylethane derivatives and 1,1,2,2-tetramethylethane derivatives, are also suitable. It is also possible to use an initiator mix with a high temperature initiator and a low temperature initiator, which can be fed simultaneously or separately into the reactor.

The most preferred initiators are di-tert-butyl peroxide (DTBP), tert-butylperpivalate (TBPPI), tert-amylperoxy pivalate (TAPPI) and tert-butylperoxy-2-ethyl-hexanoate.

Due to the feeding of the chain transfer agent, silane comonomer, additional comonomer and/or polymerisation initiator as front feed and/or at least one location along the reactor different reaction zones are created within the reactor. Thus, the tubular reactor as well as an autoclave reactor can comprise at least two reaction zones with differences in temperature and/or reaction mixture and product concentration.

It is in general possible that the chain transfer agent and the additional polar comonomer are fed to the feed stream comprising ethylene before said feed stream enters the compressor unit. Thus, a feed stream comprising ethylene, chain transfer agent and an additional polar comonomer are fed into the compressor unit and subsequently into the preheater unit. Only the silane comonomer is fed to the feed stream comprising ethylene, chain transfer agent and additional polar comonomer after leaving compressor unit and opt. the preheater unit and before entering the polymerisation reactor or is fed parallel to the said feed stream into the polymerisation reactor as front feed.

The compressor unit may comprise a primary compressor unit and a hyper or secondary compressor unit. Each of those compressor units comprises in turn a number of individual compressors, e.g. piston compressors. The primary compressor unit compresses the ethylene feed to a pressure between 50 and 300 bar, in particular 240 to 260 bar.

The pressurized ethylene is subsequently fed into the hyper or secondary compressor unit, which operates also in multiple stages such as two stages, wherein each stage comprises a number of compressors in parallel. After the first stage the ethylene feed is further pressurized to 1000 to 1400 bar, in particular 1100 to 1300 bar. Since the pressurization increases the temperature, the ethylene is cooled down before it is further pressurized by the second stage of the hyper compressor unit to pressures up to 3500 bar, in particular to 2500 to 3200 bar.

In an exemplary embodiment of the present process the preheater unit is operated at temperatures between 165 and 250° C., in particular between 165 and 200° C., and at a pressure between 1000 and 3500 bar, in particular between 2000 and 3000 bar. The reaction mixture is preheated in the preheater unit to the reaction start temperature of from about 165° C. to 200° C., and then conveyed to the reactor.

The reactor, such as a tubular reactor or autoclave reactor is preferably operated above the critical pressure, in particular at a pressure between 1000 and 3500 bar, more specifically between 2000 and 3200 bar in case of a tubular reactor, and at temperatures between 165 and 340° C., the feed temperature of the reactor being in the range of 165 to 200° C.

The reaction mixture comprising ethylene, chain transfer agent, silane comonomer, additional polar comonomer and initiator reacts within the reactor under formation of polyethylene copolymer. The mixture and polyethylene as product leaves the reactor at the end thereof. The polymer and the volatile part of the reaction mixture comprising mainly ethylene monomer, additional polar comonomer and chain transfer agent are subsequently separated from each other in a high pressure separator (HPS) and a low pressure separator (LPS).

The chain transfer agent and/or comonomers can further be separated from the volatile part of the reaction mixture leaving the high pressure separator and low pressure separator, in particular from the ethylene monomer in a gas purification unit. The gas purification unit removes comonomers and/or chain transfer agents from the reactor output.

The ethylene monomer as well as the comonomer and chain transfer agent can be recycled within the present process, or alternatively may be separated by e.g. distillation and stored in a storage tank prior being reintroduced into the feed section of the compressor.

The recycle stream containing comonomer and chain transfer agent can be fed into a dewaxing unit prior to the gas purification unit. Here the gaseous mixture is separated from waxes in a traditional dewaxing unit. The chain transfer agent and/or comonomer might be separated from each other in a gas-purification unit or recycled back to the compressor unit. This means that the recycle stream comprise more or less pure ethylene.

The present process previously described is thus conducted in a plant for manufacturing polyethylene copolymer, in particular low density polyethylene-silane-copolymer, comprising at least one compressor unit, in particular a compressor unit consisting of a primary compressor unit and a secondary compressor unit for the ethylene feed. The compressor unit is being located upstream of the reactor.

The present plant may comprise furthermore at least one preheater unit for preheating the ethylene feed before entering the reactor. The preheater unit may be arranged downstream of the compressor unit and upstream of the reactor. Thus, the preheater unit is located between compressor unit and polymerisation reactor. The preheater unit may comprise one or more preheater subunits, such as two preheater units.

Furthermore, it is possible to include an extra compressor unit and/or pump for each of the further feed streams containing comonomer, chain transfer agent and/or polymerisation initiator, respectively.

The reactor can be a split-feed tube reactor, a front-feed tube reactor, a multi-feed tube reactor or an autoclave reactor, preferably a multizone tube reactor.

In a further exemplary embodiment the plant comprises a high pressure separator (HPS) and a low pressure separator (LPS) being located downstream of the reactor. Here the polymer, in particular polyethylene-copolymer obtained in the reactor, in particular tubular reactor, and the gaseous mixture comprising ethylene monomer, chain transfer agent and comonomer are separated from each other and the polymer is sent for further work up, for example to an extruder.

The invention will be explained in more detail by the means of the following embodiments and figures.

FIG. 1 shows schematically a conventional process for manufacturing polyethylene with a primary and secondary compressor and a polymerisation reactor;

FIG. 2A shows schematically a first embodiment of the present process with a primary and secondary compressor and a polymerisation reactor;

FIG. 2B shows schematically modification of the first embodiment of FIG. 2A with a primary and secondary compressor and a polymerisation reactor;

FIG. 3 shows schematically a second embodiment of the present process with a primary and secondary compressor, a preheater and a polymerisation reactor;

FIG. 4 shows schematically a third embodiment of the present process with a primary and secondary compressor, a preheater and a polymerisation reactor;

FIG. 6 shows schematically a fifth embodiment of the present process with a primary and secondary compressor, a preheater and a polymerisation reactor.

Figure 5:
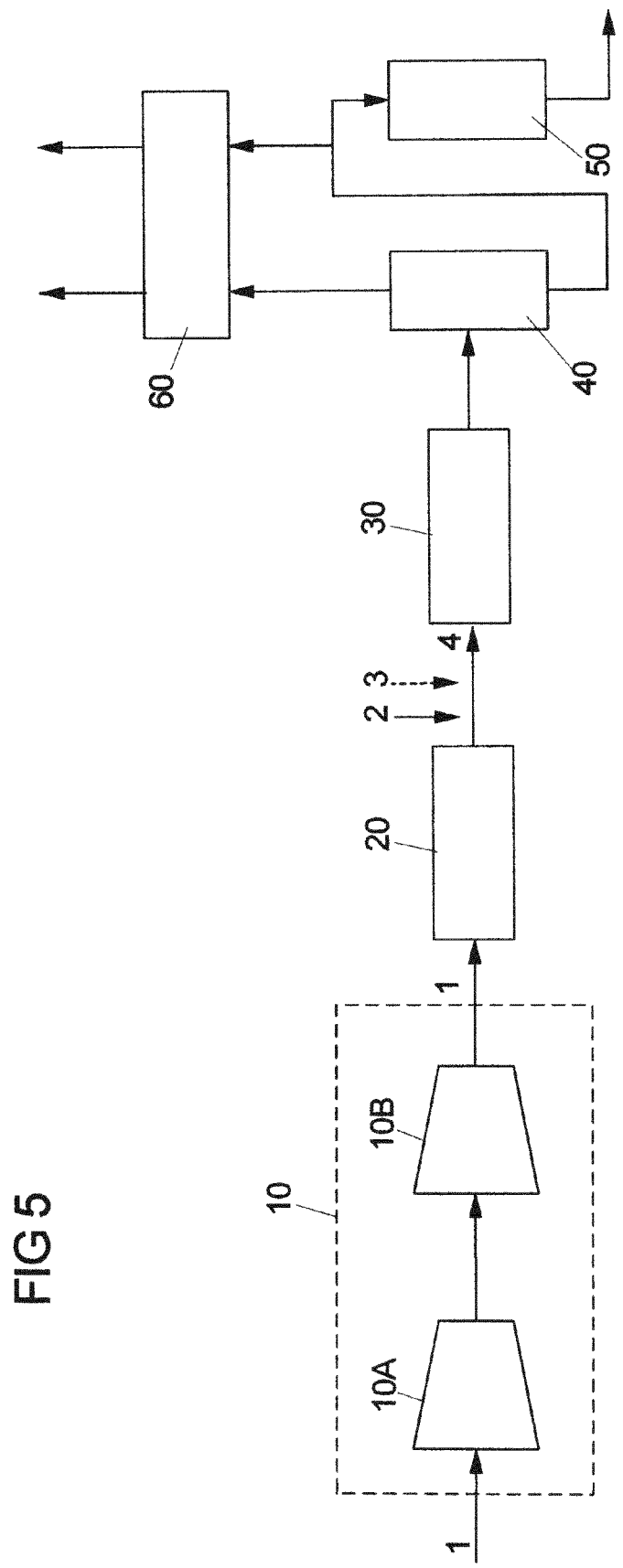
FIG. 5 shows schematically a fourth embodiment of the present process with a primary and secondary compressor, a preheater, a polymerisation reactor, a high pressure separator (HPS), a low pressure separator (LPS) and a gas purification unit.

The embodiment of FIG. 1 shows a conventional process for synthesizing a polyethylene-silane copolymer. Here a compressor unit 10 comprising a primary compressor 10A and a secondary compressor 10B are located upstream of the tubular polymerisation reactor 30. In this conventional process the ethylene feed 1 enters the primary compressor 10A for being partially compressed up to a pressure between 150 and 250 bar. When leaving the primary compressor 10A the silane comonomer feed 2 and optionally the chain transfer agent feed 3 are added to the partially compressed ethylene feed.

The obtained mixture comprising ethylene, silane comonomer and chain transfer agent enter subsequently the secondary compressor 10B and is there being compressed to the pressure required in the polymerisation reactor, for example to a pressure between 1000 and 3500 bar.

After leaving the secondary compressor 10B the pressurized feed 4 of ethylene, silane comonomer and chain transfer agent enter the reactor 30 for subsequent polymerisation. The polymerisation within the reactor is usually started by adding a polymerisation initiator to the reactor (not shown).

In particular when using a silane comonomer like vinyltrimethylsilane (VTMS) it has been found that a deposition of solid silane compounds occurs. This type of deposition is in particular caused by an interaction of the silane compound with the compressor oil. Silanes influence also the viscosity and adhesion forces of the compression oils. This interaction results in severe vibrations and wearing of the compressor sealings.

In order to circumvent this problem the present process offers a solution.

FIG. 2A shows a first embodiment of the present process wherein the ethylene feed 1 is also fed to a compressor unit 10 consisting of a primary compressor 10A and a secondary compressor 10B. The ethylene feed is pressurized in the compressor unit 10 up to a final pressure between 1000 and 3500 bar, in particular 2000 bar and 3000 bar for a tubular reactor and 1000 to 2000 bar for an autoclave reactor.

Only after leaving the compressor unit 10 and before entering the polymerisation reactor 30 the pressurized ethylene feed 1 is mixed with a silane comonomer feed 2 and optionally with a chain transfer feed 3. The combined feed 4 containing ethylene, silane comonomer and opt. chain transfer agent is subsequently fed to the polymerisation reactor, where the polymerisation reaction is started by adding the polymerisation initiator (not shown).

The present process thus avoids a premixing of ethylene and silane comonomer at high pressure conditions like in the secondary compressor unit 10B. This approach avoids a silane deposition for instance in the secondary compressor unit and preheater.

FIG. 2B shows a modification of the embodiment of FIG. 2A. Here the silane comonomer 2 is injected into the reactor 30 in parallel to the ethylene feed 1 as front feed. Thus, the silane comonomer 2 and the ethylene feed 1 are not mixed before entering the reactor 30 as front feed but are rather only mixed within in the reactor 30. This allows for a conversion of the silane comonomer 2 in the reactor 30; whereby the conversion rate of the silane comonomer is between 30 to 90% depending if recycled gas is used as ethylene feed (in this case the silane conversion is 50 to 90%) or if no recycled gas is used as ethylene feed (in this case the silane conversion is between 30 to 70%). However, in both cases a reduced amount of silane comonomer 2 leaves the reactor 30 unreacted.

FIG. 3 is a variation of the first embodiment. The process flow sheet is basically identical to the one of the embodiment in FIG. 2B so that reference can be made to the previous description.

In the embodiment of FIG. 3 a preheater unit 20 is arranged downstream of the compressor unit 10 and upstream of the reactor 30. The pressurized ethylene feed 1 leaving the compressor unit 10 is preheated to a temperature between 165 and 200° C. in the preheater unit 20 which may comprise at least two preheater subunits.

Only after leaving the preheater 20 the pressurized and preheated ethylene feed 1 is combined with a chain transfer agent feed 3. The combined feed 4 of ethylene and chain transfer agent enters subsequently the reactor 30, preferably as front feed. The silane comonomer feed 2 is fed separately to the combined feed 4 to the reactor 30 as front feed. The polymerisation reaction is started by adding the polymerisation initiator to the reactor (not shown).

In FIG. 4 a further variation of the present process is shown. The process flow sheet is basically identical to the previously described embodiment of FIG. 3 so that reference can be made to the previous description.

In addition to the second embodiment the silane comonomer 2A, 2B and/or chain transfer agent 3A, 3B is injected also at various locations along the tubular reactor 30. The respective feeds are spaced lengthwise along reactor tube 30 for supplying the chain transfer agent and/or comonomer.

The chain transfer agent 3A, 3B added additionally along the reactor tube 30 can be the same or different than the chain transfer agent 3 added to the ethylene stream 1 before entering the reactor.

In FIG. 5 a further variation of the second embodiment of FIG. 3 is shown. The process flow sheet is basically identical to the one of the second embodiment in FIG. 3 so that reference can be made to the previous description.

In addition to the embodiment of FIG. 3 the plant shown in FIG. 5 comprises a high pressure separator (HPS) 40 and a low pressure separator (LPS) 50 being located downstream of the reactor 30. Here polyethylene obtained in the reactor 30 and the gaseous mixture comprising ethylene monomer, comonomer and chain transfer agent are separated from each other and the polymer is sent for further work up, for example to an extruder.

The chain transfer agent and/or comonomer are further separated from the volatile part of the reaction mixture in a gas purification unit 60. The ethylene monomer can be subsequently recycled and is sent to one of the compressor units, in particular the secondary compressor unit (not shown).

FIG. 6 is a further variation of the embodiment of FIG. 3. The process flow sheet is basically identical to the one of the embodiment depicted in FIG. 3 so that reference can be made to the previous description.

In the embodiment of FIG. 6 a preheater unit 20 is arranged downstream of the compressor unit 10 and upstream of the reactor 30.

Here the ethylene feed 1 is mixed with chain transfer agent 3 and an additional polar comonomer (not shown) before said stream enters the compressor unit 10. Thus, a feed stream comprising ethylene, chain transfer agent and an additional polar comonomer are fed into the compressor unit 10 and subsequently into the preheater unit 20. The pressurized ethylene feed 1 containing chain transfer agent and additional polar comonomer leaving the compressor unit 10 is also preheated to a temperature between 165 and 180° C. in the preheater unit 20 which may comprise at least two preheater subunits.

Only after leaving the preheater 20 the pressurized and preheated ethylene feed 1 containing chain transfer agent and additional polar comonomer is combined with a silane comonomer feed 2. The combined feed 4 of ethylene, silane comonomer, chain transfer agent and additional comonomer enters subsequently the reactor 30. The polymerisation within the reactor is usually started by adding a polymerisation initiator to the reactor (not shown).

It is to be understood that any suitable combination of the embodiments as shown in the figures is part of the present invention. The invention is not only be limited to the singularly examples as described in the figures.

EXAMPLE 1

The kinetic viscosity was measured according to DIN 51562 with the Ubbelohde viscosity measurement for different commercial lubricants suitable for lubrication for high pressure polyethylene compressors was investigated at 40° C. with and without addition of VTMS (Table 1).

TABLE 1

| | VTMS concentration, w-% | | | |
|---|---|---|---|---|
| Lubricant | 0 | 1.0 | 3.5 | |
| Total Orites 270DS 275 | 275 | 254 | 210 | mm$^2$/s |
| Shell Corena E220 | 233 | 203 | 151 | mm$^2$/s |
| Sonneborn CL1200EU | 243 | 210 | 164 | mm$^2$/s |

It is obvious that VTMS has a surprisingly large effect of the viscosity already at the limited VTMS concentrations typical for ethylene-silane co-polymerisations. Thus, it can be concluded that VTMS decreases the viscosity for the oil. This means that ordinary lubrication, which is less efficient then VTMS, is present. This leads to an increased wear, which reduces operational time.

EXAMPLE 2

In Table 2 the detrimental effect on compressor units is shown when a silane-comonomer is present in the feed stream. Since compressor units are mechanically very complex, they are sensitive to changes in process conditions. One parameter, which indicates mechanical problems, is the use of lubricants in the hyper compressor. The following table 2 shows that the use of lubricants for synthesizing homo polyethylene causes no vibrations in the compressor. When 3.5 wt % of VTMS are present in the feed the compressor will start to vibrate, and within 1 to 2 hours the vibrations will be so strong that the compressor needs to be shutdown in order to prevent failure or damage of the compressor.

TABLE 2

| Location in compressor | Lubricant use without VTMS |
|---|---|
| Primary compressor unit, first lubricant feed | 32 l/day |
| Primary compressor unit, second lubricant feed | 32 l/day |
| Primary compressor unit, third lubricant feed | 32 l/day |
| Hyper compressor unit, first lubricant feed | 28 l/day |
| Hyper compressor unit, second lubricant feed | 28 l/day |
| Hyper compressor unit, third lubricant feed | 28 l/day |

The vibrations can be caused by various means. It can be caused by silane deposits found in the compressor unit after the use of VTMS in the feed of the compressor units, and/or it can also be that the lubrication is insufficient when VTMS is present due to the kinetic viscosity effect shown in example 1.

The primary compressor unit is a piston compressor with a piston diameter of 120 mm. It performs 186 rpm, the stroke length is 362 mm, resulting in an average speed of 2.26 m/s.

The hyper compressor unit is a piston compressor with a piston diameter of 75 mm. It performs 187 rp; the stroke length is 330 mm, resulting in an average speed of 2.06 m/s. The oil was Shell Corena E220.

EXAMPLE 3

Product Transfer Time

Two reactors with 7 ton/hour polyethylene capacity with product receivers of 2 tons are compared for product transfer time. The reactors are producing homo polyethylene with food approval and polyethylene with VTMS (1.9 wt %) copolymers without food approval. In order to get food approval the polymer must be free of VTMS.

The first reactor is equipped with a gas purification unit 60 (see FIG. 5). The transition time from a VTMS containing polymer to a polymer without VTMS (with food approval) is 1.5*time to empty product receiver which equal 0.5 hours. The second reactor is not equipped with a gas purification unit 60. The configuration of the reactor is described above as known set-up for a high-pressure polyethylene reactor. Transition time of making polymers is described below. The transition time is defined of being the time when the comonomers are no longer detectable with online FTIR analysis equipment.

TABLE 3

| | Products | | |
|---|---|---|---|
| | MFR2, g/10 min | Density, kg/m3 | VTMS, wt % |
| LDPE 1 | 0.7 | 923 | 0 |
| Ethylene/Silane | 1.0 | 922.5 | 1.9 |

TABLE 4

Product transfer times in hours without gas purification unit.

| | LDPE 1 | LDPE 2 | Ethylene/Octadiene | Ethylene/Silane |
|---|---|---|---|---|
| LDPE 1 | X | 1 | 4 | 3 |
| LDPE 2 | 1 | X | 4 | 3 |
| Ethylene/Octadiene | 3 | 3 | X | 8 |
| Ethylene/Silane | >8 | >8 | 8 | X |

For reactor of this site this means that up to 56 ton of polymer can be transition material, with limited economical value. For a current full size plant that makes up to 50 ton/hour and it means transition material of 400 ton.

Producing an ethylene silane copolymer with 1.5 wt % of VTMS groups in the polymer can be made using the invention by a conventional high pressure radical reactor that is modified by injecting a second feed stream that has not passed the compressor. The second stream is pressured by a LEWA pump and comprises VTMS that is charged in the front of the tube reactor. The recycle stream comprises unreacted VTMS. The content of VTMS through the hyper is reduced by at least 70%. During these condition is the performance of the oil enough to lubricate the hyper compressor without vibrations.

The invention can be used so that concentration of VTMS is reduced as much as possible through the compressors. This means that the concentration of VTMS in practice can be reduced from typically 3.5 wt % down to 1 wt % in the oil of the compressor by adding the VTMS after the compressors.

Example 1 shows that VTMS concentration has strong influence on kinetic viscosity, and this enables continuous operation of compressors. The addition of a gas purification step for separating VTMS from the recycle stream would further improve the invention since there won't be no VTMS in the compressors and consequently in the oil of the compressor. The separation step would increase investment, energy consumption and operational cost. On the other hand the transition time can be reduced by 100% to 500%.

It is to be understood that the embodiments and examples described above are only exemplary and that any combination thereof is possible.

LIST OF REFERENCE SIGNS

1 ethylene stream
2 silane comonomer stream
2A, 2B silane comonomer sub-streams
3, 3A, 3B chain transfer agent stream
4 combined stream after leaving the preheater unit 10A
10 compressor unit
10A, 10B compressor sub-units
20 preheater unit
30 tubular reactor
40 high pressure separator HPS
50 low pressure separator LPS
60 gas purification unit

The invention claimed is:

1. A process for manufacturing polyethylene-silane copolymer conducted in a plant comprising at least one compressor unit and at least one reactor being downstream of the compressor unit,
the process comprising the steps of:
a) feeding a first feed stream comprising ethylene into the at least one compressor unit and subsequently to the at least one reactor, and
b1) feeding a second feed stream comprising at least one silane comonomer to the first feed stream only after the first feed stream comprising ethylene leaves the compressor unit and feeding the combined feed stream comprising ethylene and the at least one silane comonomer to the at least one reactor as front feed and/or
b2) feeding another second feed stream comprising at least one silane comonomer to the at least one reactor at at least one location along the reactor.

2. The process according to claim 1, wherein the concentration of the silane comonomer being fed at a location along the reactor is the same as or differs from the concentration of the silane comonomer entering the reactor at the front.

3. The process according to claim 1, wherein the concentration of the silane comonomer being fed at the front of reactor is more than 50 wt % of the concentration of the silane comonomer entering the reactor in total.

4. The process according to claim 1, wherein the at least one silane comonomer if fed to the reactor at a location along the reactor is added to the reactor using at least one high pressure plunger pump.

5. The process according to claim 1, wherein the silane comonomer comprises an unsaturated silane compound represented by the general formula

RSiR'$_n$Y$_{3-n}$ wherein R is an ethylenically unsaturated hydrocarbyl, hydrocarbyloxy or (meth)acryloxy hydrocarbyl group, R' is an aliphatic saturated hydrocarbyl group, Y is a hydrolysable organic group, and n is 0, 1 or 2.

6. The process according to claim 5, wherein the unsaturated silane compound is a compound represented by the formula

CH$_2$=CHSi(OA)$_3$ wherein A is a hydrocarbyl group having 1-8 carbon atoms.

7. The process according to claim 5, wherein the unsaturated silane is selected from a group consisting of vinyl trimethoxysilane (VTMS), vinyl dimethoxyethoxy silane, vinyl triethoxysilane, gamma-(meth)acryloxypropyltrimethoxysilane, gamma(meth)acryloxypropyltriethoxysilane, vinyl triacetoxysilane, and any combinations thereof.

8. The process according to claim 1, wherein at least one further polar comonomer is additionally fed to the feed stream comprising ethylene before said feed stream enters the compressor unit, is fed to the feed stream comprising ethylene before entering the at least one reactor as front feed and/or is fed to the reactor at at least one location along the reactor.

9. The process according to claim 8, wherein the at least one additional polar comonomer is selected from the group consisting of vinyl carboxylate esters; alpha-olefins; (meth) acrylates; vinyl ethers; aromatic vinyl compounds and any combination thereof.

10. The process according to claim 8, wherein the at least one additional polar comonomer is selected from a group consisting of vinyl acetate (EVA), methacrylates maleic anhydride (MAH), and acrylamide.

11. The process according to claim 1, wherein a third feed stream comprising at least one chain transfer agent is fed to the feed stream comprising ethylene before said feed stream enters the compressor unit, is fed to the feed stream comprising ethylene before entering the at least one reactor as front feed and/or is fed to the reactor at at least one location along the reactor.

12. The process according to claim 11, wherein the chain transfer agent is selected from a group consisting of propionaldehyde, propylene, propane, methyl ethyl ketone, isopropanol, methyl vinyl sulfide, n-butyronitrile, butene-1,4-methylpentane-1, isobutylene, diisobutylene, acetaldehyde and mixtures thereof.

13. The process according to claim 1, wherein the at least one reactor is operated above a critical pressure of between 1000 and 3500 bar and at temperatures between 165 and 340° C., the feed temperature of either or both first and second feed streams of the reactor being in the range of 165 to 200° C.

14. The process according to claim 11, wherein the chain transfer agent and/or comonomers are separated from the volatile part of the reaction mixture from the reactor in a gas purification unit.

15. The process according to claim 1, wherein the ethylene of the first feed stream is fresh ethylene, ethylene recycled from the reactor without any further purification and/or ethylene recycled from the reactor, which underwent gas purification.

16. The process according to claim 1, wherein the concentration of the silane comonomer being fed at the front of the reactor is more than 75% of the concentration of the silane comonomer entering the reactor in total.

17. The process according to claim 4, wherein the at least one high pressure plunger pump is of the type of LEWA plunger pumps.

18. The process according to claim 5, wherein the unsaturated silane compound is a compound represented by the formula

CH$_2$=CHSi(OA)$_3$ wherein A is a hydrocarbyl group having 1-4 carbon atoms.

19. The process according to claim 10, wherein the methacrylates are selected from a group consisting of methyl acrylate (EMA), ethyl acrylate (EEA), butyl acrylate (EBA), methyl methacrylate (EMMA), and glycidyl methacrylate (GMA).

20. The process according to claim 1, wherein the at least one reactor is operated above a critical pressure of between 2000 and 3200 bar, and at temperatures between 165 and 340° C., the feed temperature of either or both first and second feed streams of the reactor being in the range of 165 to 200° C.

* * * * *